United States Patent
Tanaka (10) Patent No.: US 11,431,870 B2
(45) Date of Patent: Aug. 30, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Kohei Tanaka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 159 days.

(21) Appl. No.: 16/565,416

(22) Filed: Sep. 9, 2019

(65) Prior Publication Data

US 2020/0092434 A1    Mar. 19, 2020

(30) Foreign Application Priority Data

Sep. 19, 2018  (JP) .............................. JP2018-175457

(51) Int. Cl.
*H04N 1/00* (2006.01)

(52) U.S. Cl.
CPC ..... *H04N 1/00896* (2013.01); *H04N 1/00891* (2013.01); *H04N 1/00917* (2013.01)

(58) Field of Classification Search
None
See application file for complete search history.

(56) References Cited

U.S. PATENT DOCUMENTS

| | | | |
|---|---|---|---|
| 7,619,760 B2 | 11/2009 | Sakamoto | |
| 8,248,649 B2 | 8/2012 | Akiyama et al. | |
| 9,042,547 B2 | 5/2015 | Takizawa | |
| 10,635,283 B2 | 4/2020 | Kimura et al. | |
| 2006/0143706 A1 | 6/2006 | Kawasaki et al. | |
| 2016/0224298 A1* | 8/2016 | Nogawa | H04N 1/00917 |
| 2017/0163830 A1* | 6/2017 | Goda | H04N 1/32793 |
| 2021/0306516 A1* | 9/2021 | Yamada | H04N 1/346 |

FOREIGN PATENT DOCUMENTS

| | | |
|---|---|---|
| JP | 2005159550 | 6/2005 |
| JP | 2005225177 | 8/2005 |
| JP | 2006181882 | 7/2006 |
| JP | 2008183722 | 8/2008 |
| JP | 2010002970 | 1/2010 |
| JP | 2012034203 | 2/2012 |
| JP | 2014065146 | 4/2014 |
| JP | 2015072293 | 4/2015 |
| WO | 2015152084 | 10/2015 |

OTHER PUBLICATIONS

"Office Action of Japan Counterpart Application" with English translation thereof, dated Jun. 21, 2022, p. 1-p. 9.

* cited by examiner

*Primary Examiner* — Frantz Bataille
(74) *Attorney, Agent, or Firm* — JCIPRNET (57) ABSTRACT

An information processing apparatus includes an image processing section that executes image processing, the operation control section that controls an operation of the information processing apparatus in any of two or more operation states including at least a first operation state, in which operations by all functions of the information processing apparatus are possible, and a second operation state in which operations by some functions of the information processing apparatus are limited, and the data processing section that executes specific data processing, which does not involve the image processing by the image processing section, in a case where the operation control section performs control in the second operation state.

12 Claims, 7 Drawing Sheets

| OPERATION STATE | TRANSITION CONDITION | OPERATION STATE OF TRANSITION DESTINATION |
|---|---|---|
| NORMAL STATE | FIXED TIME ELAPSES WITHOUT PERFORMING EITHER IMAGE PROCESSING OR UI MANIPULATION | POWER SAVING OPERATION STATE |
| POWER SAVING OPERATION STATE | INSTRUCTION TO PERFORM IMAGE PROCESSING OR PREPARATION OPERATION OF UI MANIPULATION IS PERFORMED | NORMAL STATE |
| POWER SAVING OPERATION STATE | FIXED TIME ELAPSES WITHOUT PERFORMING EITHER IMAGE PROCESSING OR UI MANIPULATION | DORMANT STATE |
| DORMANT STATE | INSTRUCTION TO PERFORM IMAGE PROCESSING OR PREPARATION OPERATION OF UI MANIPULATION IS PERFORMED | NORMAL STATE |
| DORMANT STATE | EXECUTION CONDITION OF DATA PROCESSING, WHICH IS EXECUTED IN POWER-SAVING OPERATION STATE, IS SATISFIED | POWER SAVING OPERATION STATE |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-175457 filed Sep. 19, 2018.

BACKGROUND

(i) Technical Field

The present invention relates to an information processing apparatus and a non-transitory computer readable medium storing a program.

(ii) Related Art

In an information processing apparatus, power consumption is reduced by controlling supply of power with respect to respective units according to an operation mode. With regard to an image processing apparatus as an example of the information processing apparatus, a related art disclosed in JP2015-072293A below includes a plurality of combinations of operations with units to be stopped according to a type of a job, and properly uses the combinations according to a received job, thereby achieving both energy saving and improvement in operability.

In addition, nowadays, the image processing apparatus performs various types of data processing with respect to data which is accumulated in a storage device, data which is acquired from the outside, and the like, in addition to execution of jobs involving operations of an Image Output Terminal (IOT) and an Image Input Terminal (IIT).

SUMMARY

In a case where a plurality of types of processing are simultaneously executed in an information processing apparatus, there is a case of causing deterioration in efficiency in the respective types of processing. In a case where jobs involving operations of an IOT or an IIT and data processing excepting the jobs are simultaneously executed in an image processing apparatus as an example of the information processing apparatus, deterioration in processing capabilities is caused in the jobs which are principal functions of the image processing apparatus.

Aspects of non-limiting embodiments of the present disclosure relate to an information processing apparatus which executes target data processing without deteriorating processing capabilities in principal processing, compared to a configuration in which various types of processing are permitted to be simultaneously executed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an image processing section that executes image processing; an operation control section that controls an operation of the information processing apparatus in any of two or more operation states including at least a first operation state, in which operations by all functions of the information processing apparatus are possible, and a second operation state in which operations by some functions of the information processing apparatus are limited; and a data processing section that executes specific data processing, which does not involve the image processing by the image processing section, when during the operation control section performs control in the second operation state.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings. Although the exemplary embodiment may be applied to an information processing apparatus having various configurations, here, a case where the exemplary embodiment is applied to an image processing apparatus will be described as an example. The image processing apparatus according to the exemplary embodiment is an apparatus which performs input and output of an image, performs digitized image processing, and performs communication. In addition, the image processing apparatus collects data which is acquired in the information processing apparatus or the external device, and transmits the data to a management server. The image processing apparatus is an apparatus which is capable of adding and extending a function through addition or the like of a plugin (program).

Configuration of Apparatus

Figure 1:
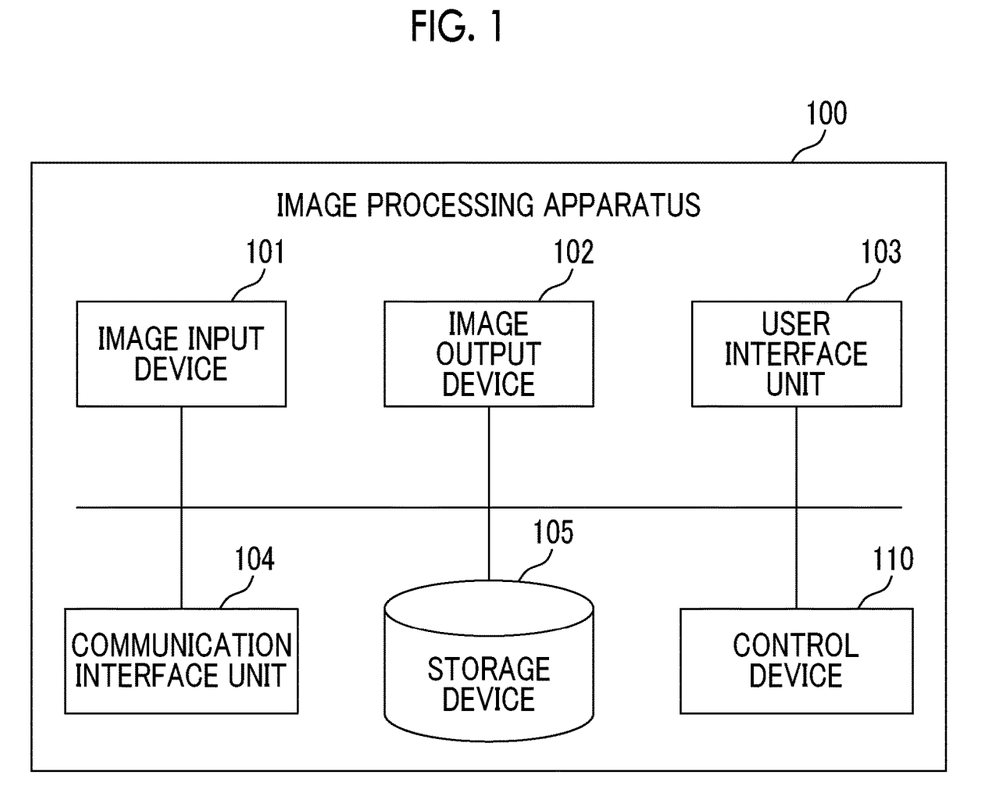
FIG. 1 is a diagram illustrating a configuration of an image processing apparatus to which an exemplary embodiment is applied.

FIG. 1 is a diagram illustrating a configuration of the image processing apparatus to which the exemplary embodiment is applied. An image processing apparatus 100 includes an image input device 101, an image output device 102, a user interface unit 103, a communication interface unit 104, a storage device 105, and a control device 110.

The image input device 101 is an Image Input Terminal (IIT). The image input device 101 is configured with a so-called scanner device, optically reads an image on a document which is set, and generates a read image (image data). An image reading method includes, for example, Charge Coupled Devices (CCD) method for reducing reflected light with respect to light, which is irradiated to the document, from a light source using a lens and for receiving the reflected light using the CCD and a Contact Image Sensor (CIS) method for receiving reflected light with respect to light, which is sequentially irradiated to the document from a Light Emitting Diode (LED) light source, using a CIS.

The image output device 102 is an Image Output Terminal (IOT). The image output device 102 is configured with a so-called printer device, and forms an image based on the image data using an image forming material with respect to paper which is an example of a recording material. A method for forming the image on the recording material includes, for example, an electrographic method for forming the image by transferring toner adhered to a photoreceptor to the recording material, an inkjet method for forming the image by discharging ink on the recording material, and the like.

The User Interface (UI) unit 103 includes a display section that displays a screen, such as a manipulation screen or an information exhibition screen, and an input section on which an input manipulation by a manipulator is performed. In a case where the input manipulation by the input section is performed according to the manipulation screen which is displayed on the display section, various control commands and control data are input. For example, a liquid crystal display is used as the display section. For example, a hardware key and a touch sensor are used as the input section. As an example, a touch panel, in which the liquid crystal display that is the display section is combined with the touch sensor that is the input section, may be used.

The communication interface unit 104 is a connection section that is used to connect to an external machine through a network and to exchange data. Although not being distinguished specifically, according to a type of the communication section, a network port of the Ethernet (registered trademark), a Universal Serial Bus (USB) port, a wireless communication device for wireless LAN connection and connection through Bluetooth (registered trademark), and the like are provided.

The storage device 105 is a device that maintains the image data, which is used in the image input device 101 or the image output device 102, or maintains data which is collected from the information processing apparatus or the external device. In addition, the storage device 105 maintains and accumulates log data which will be described later. The storage device 105 is an example of a log data accumulation section. The storage device 105 is configured using a magnetic disk device or a non-volatile memory.

The control device 110 is a controller that controls respective functional units of the image processing apparatus 100. The control device 110 is an example of the information processing apparatus. The control device 110 is configured with a Central Processing Unit (CPU) that is an arithmetic device, a Read Only Memory (ROM) that stores a program which realizes each control function, and a Random Access Memory (RAM) that is used as an operational area. In a case where the CPU executes the program which is stored in the ROM, each function in the control device 110 is realized. The control device 110 performs control relevant to an extended function, which is different from control or processing relevant to image processing, in addition to an initially provided basic function for controlling the image input device 101, the image output device 102, the user interface unit 103, the communication interface unit 104, the storage device 105, and the like. An example of the extended function includes a function for performing processing with respect to data, which is collected from the information processing apparatus or the external device and is maintained in the storage device 105, a function for transmitting the processed data to an external server, and the like. Subsequently, the function of the control device 110 will be described in detail.

Configuration of Control Device

Figure 2:
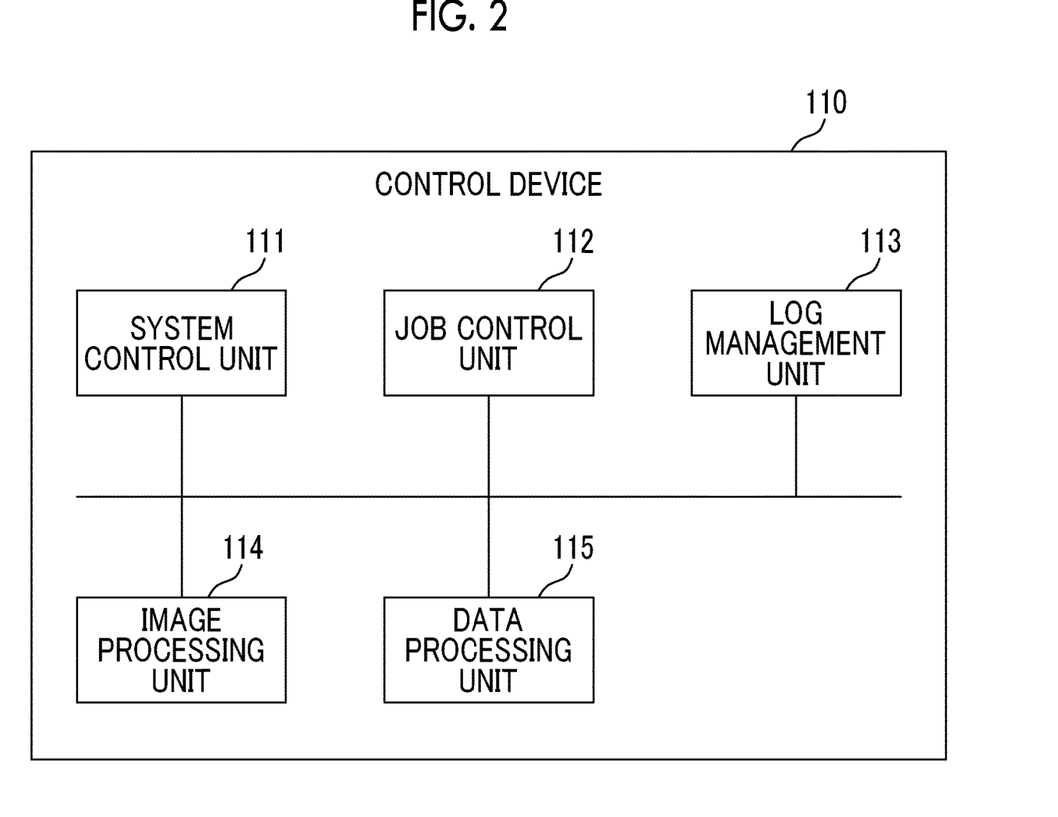
FIG. 2 is a diagram illustrating a functional configuration of a control device.

FIG. 2 is a diagram illustrating a functional configuration of the control device 110. The control device 110 includes a system control unit 111, a job control unit 112, a log management unit 113, an image processing unit 114, and a data processing unit 115.

The system control unit 111 controls the entirety of operations of the image processing apparatus 100. That is, the system control unit 111 controls operations of the image input device 101, the image output device 102, the user interface unit 103, the communication interface unit 104, the storage device 105, and the like. The system control unit 111 controls an operation state of the image processing apparatus 100 as any of a normal state, a power saving operation state, and a dormant state. The system control unit 111 is an example of an operation control section. In addition, the system control unit 111 is an example of a determination section that determines a current operation state of the information processing apparatus.

The normal state, which is a first operation state, is an operation state in which operations by all of the functions of the image processing apparatus 100 are possible. More specifically, in the normal state, the operations of all the control device 110 (CPU), the image input device 101, the image output device 102, the user interface unit 103, the communication interface unit 104, and the storage device 105 are possible in the image processing apparatus 100.

The power saving operation state, which is a second operation state, is an operation state in which operations by some functions of the image processing apparatus 100 are limited. More specifically, in the power saving operation state, the operations of the control device 110 (CPU), the image output device 102, the communication interface unit 104, and the storage device 105 are possible in the image processing apparatus 100. In contrast, the image input device 101 and the user interface unit 103 are in a state in which supply of power is cut and the operations are not performed.

The dormant state, which is a third operation state, is an operation state in which, in the functions of the image processing apparatus 100, operations by a large number of functions are limited compared to the power saving operation state. More specifically, in the dormant state, power is intermittently supplied with respect to some of the control device 110 (CPU) and operations by relevant some functions are possible in the image processing apparatus 100. In addition, the operation of the communication interface unit 104 is possible. In contrast, the image input device 101, the image output device 102, the user interface unit 103, and the storage device 105 are in a state in which the supply of power is cut and the operations are not performed.

The job control unit 112 controls start, stop and completion of a job which is executed by the image input device 101 or the image output device 102. Specifically, the job control unit 112 controls, for example, a job such as copy, print, or scan.

The log management unit 113 manages log data of a job (job log data, hereinafter, referred to as a job log), which is executed by the image input device 101 or the image output device 102, and log data of an image file (image log data, hereinafter, referred to as an image log) which is processed by the image input device 101 or the image output device 102. The job log and the image log are managed by the log management unit 113 and are maintained in the storage device 105. The log management unit 113 is an example of a storage section.

The image processing unit 114 executes various types of processing which are necessary to form the image in processing of the image input device 101 or the image output device 102. The types of processing which are necessary to form the image include, for example, color correction, grayscale correction, and the like. The image processing unit 114 (control device 110), the image input device 101, and the image output device 102 are examples of an image processing section.

The data processing unit 115 executes various types of data processing which are different from the image processing by the image processing unit 114. The types of processing by the data processing unit 115 include, for example, collection of data from the information processing apparatus or the external device, treatment processing of the collected data, transmission of the collected and treated data to an external server, and the like. As an example, a system is taken into consideration which transmits information accumulated in the image processing apparatus 100 to the external server (for example, a cloud server), analyzes a task or a problem in the external server, and provides the information to a customer or a business department. In the system, the information accumulated in the image processing apparatus 100 includes, for example, the job log or the image log which is managed in the log management unit 113, sensor information which is received from an external sensor, and the like. There is a possibility that the information includes individual information of a user who executes the job, a maker name or a model name of the sensor, and secret information. Therefore, before the data processing unit 115 transmits the collected data to the external server, the data processing unit 115 performs processing (filter processing) for removing the individual information, the secret information, or the like from the collected information as the treatment processing. The data processing by the data processing unit 115 is executed in a case where the operation state of the image processing apparatus 100 is the power saving operation state in the above-described three operation states. The data processing unit 115 is an example of a data processing section.

Transition Condition of Operation State

Transition control of the operation state by the system control unit 111 will be further described. In a case where a predetermined transition condition is satisfied in each operation state, the system control unit 111 causes the operation state of the image processing apparatus 100 to transition to another predetermined operation state according to the satisfied transition condition.

Figure 3:
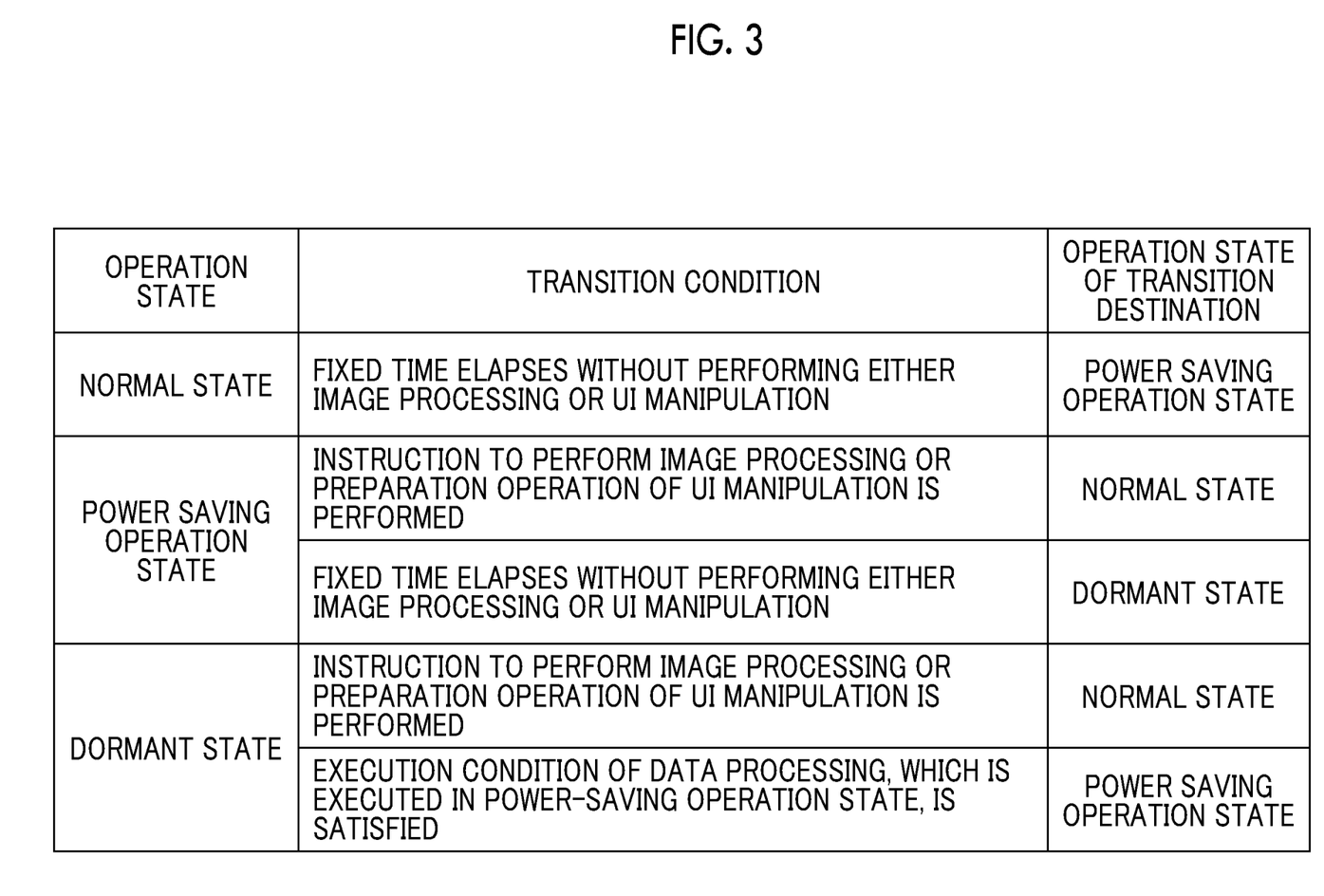
FIG. 3 is a table illustrating a relationship between a transition condition and an operation state of a transition destination in each operation state.

FIG. 3 is a table illustrating a relationship between the transition condition and the operation state of a transition destination in each operation state. Referring to FIG. 3, the system control unit 111 causes the operation state to transition to the power saving operation state in the normal state under a condition that fixed time elapses without performing either the image processing or UI manipulation. Here, the image processing is a job which is performed using the image input device 101 or the image output device 102. In addition, the UI manipulation is manipulation performed according to the manipulation screen which is displayed by the user interface unit 103.

In addition, the system control unit 111 causes the operation state to transition to the normal state in the power saving operation state under a condition that instruction to perform the image processing or a preparation operation of the UI manipulation is performed. Here, the instruction of the image processing includes an instruction transmitted from the external device through the network, in addition to an instruction which is input due to the UI manipulation. In addition, the preparation operation of the UI manipulation includes display of the manipulation screen on the display section of the user interface unit 103 according to manipulation of a manipulation section by the user, detection of the user by a human sensor, and the like.

In contrast, the system control unit 111 causes the operation state to transition to the dormant state in the power saving operation state under a condition that the fixed time elapses without performing either the image processing or the UI manipulation. Here, the elapsed time, which is used as the transition condition from the power saving operation state to the dormant state, and the elapsed time, which is used as the transition condition from the above-described normal state to the power saving operation state, are individually set.

In addition, the system control unit 111 causes the operation state to transition to the normal state in the dormant state under a condition that the preparation operation of the instruction of the image processing or the UI manipulation is performed. In contrast, the system control unit 111 causes the operation state to transition to the power saving operation state in the dormant state under a condition that an execution condition of the data processing, which is executed in the power saving operation state, is satisfied. Here, the execution condition of the data processing, which is executed in the power saving operation state, includes, for example, execution time in which data processing is regularly executed.

Relationship Between Transition Control of Operation State and Data Processing by Data Processing Unit The transition control of the operation state in the control device 110 is performed according to the transition condition in principle. Here, in a case where a transition condition to another operation state is satisfied while data processing is being executed by the data processing unit 115 in the power saving operation state, it is necessary to normally end the data processing, which is being executed, in accordance with transition of the operation state. Hereinafter, an operation of the control device 110 in a case where the power saving operation state transitions to another operation state will be described.

Figure 4:
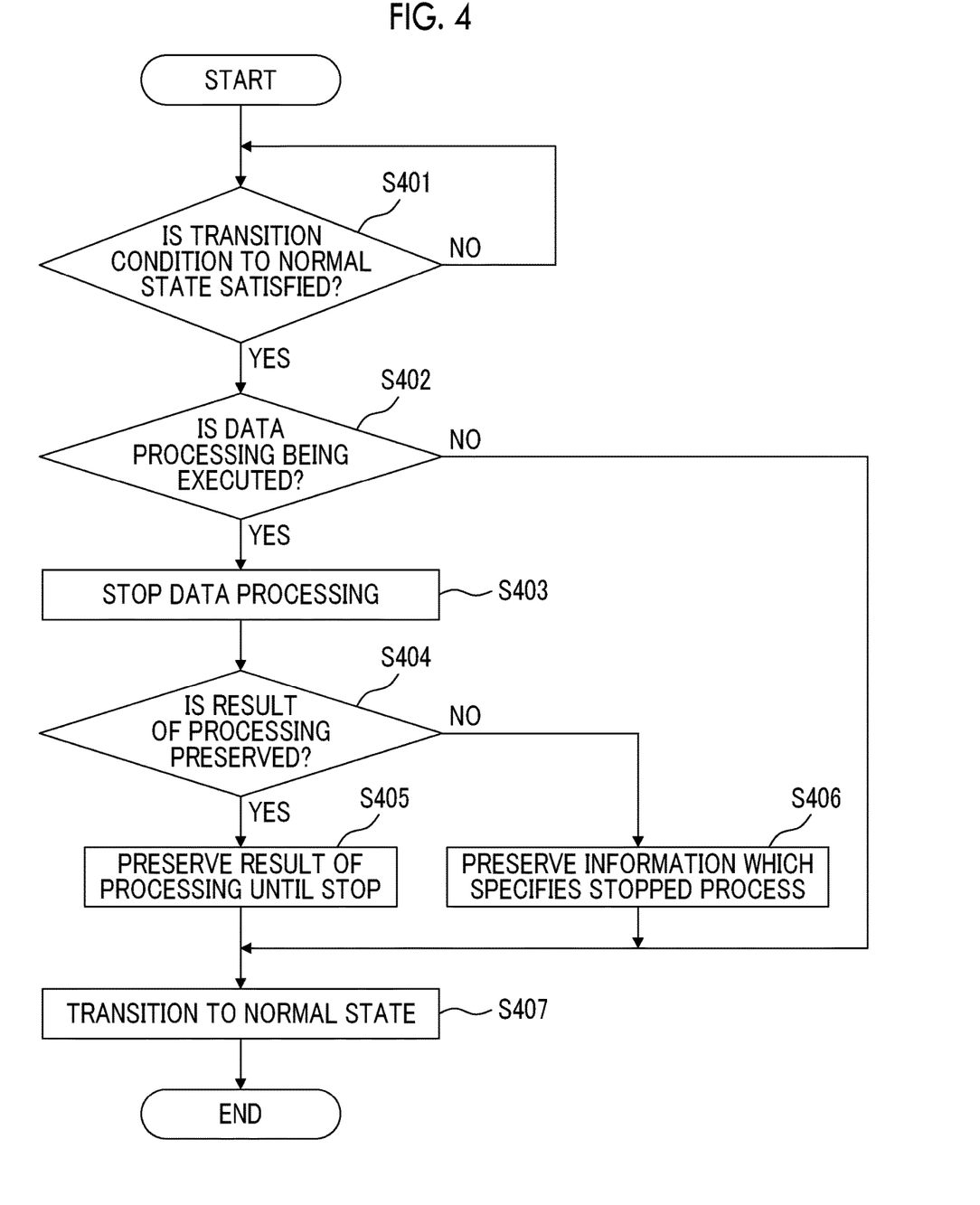
FIG. 4 is a flowchart illustrating an operation of the control device in a case where transition is performed from a power saving operation state to a normal state.

FIG. 4 is a flowchart illustrating the operation of the control device 110 in a case where transition is performed from the power saving operation state to the normal state. In a case where the transition condition to the normal state is satisfied in the image processing apparatus 100 in the power saving operation state, the control device 110 checks whether or not the data processing is being executed by the data processing unit 115 (S401 and S402). In a case where the data processing is not being executed (NO in S402), the system control unit 111 of the control device 110 causes the operation state to transition to the normal state as it is (S407).

In contrast, in a case where the data processing is being executed by the data processing unit 115 (YES in S402), the data processing unit 115 first stops the data processing, which is being executed, under the control of the control device 110 (S403). Furthermore, in a case where it is necessary to preserve a result of the processing (YES in S404), the data processing unit 115 preserves the result of the processing in the storage section until stop (S405). As the storage section, for example, the RAM of the control device 110 or the storage device 105 is used. In addition, in a case where it is not necessary to preserve the result of the processing (NO in S404), the data processing unit 115 preserves information, which specifies processing which is stopped (which is executed), in the storage section (S406). Whether or not to preserve the result of the processing is specified according to a type of the processing, which is executed, or a step of the processing, and is set in advance.

After a series of operations (S403 to S406) by the data processing unit 115 ends, the system control unit 111 causes the operation state to transition to the normal state (S407). The processing which is stopped is resumed in a case where the operation state becomes the power saving operation state, subsequently.

Figure 5:
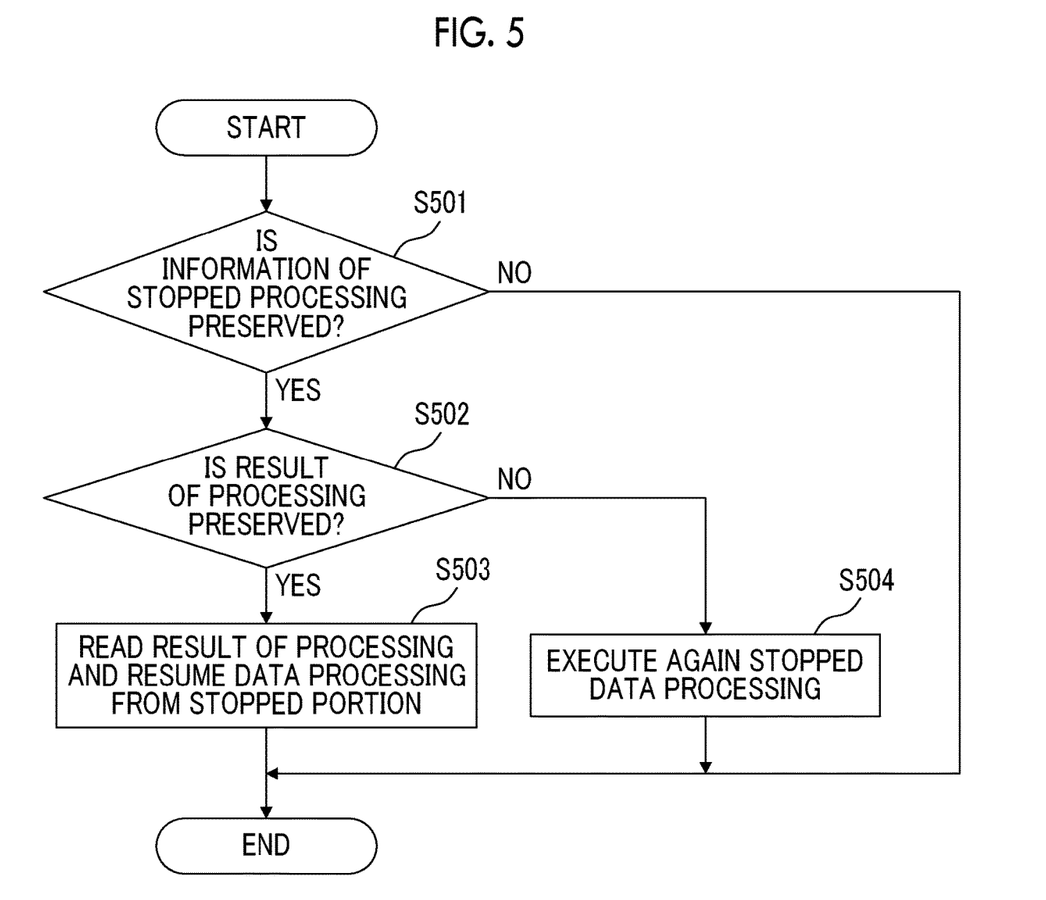
FIG. 5 is a flowchart illustrating the operation of the control device in a case where the transition is performed from the normal state to the power saving operation state.

FIG. 5 is a flowchart illustrating the operation of the control device 110 in the case where transition is performed from the normal state to the power saving operation state. In a case where the transition condition to the power saving operation state is satisfied and the system control unit 111 causes the operation state to transition to the power saving operation state, the data processing unit 115 determines whether or not the information of the processing which is stopped is preserved. In a case where the information of the processing which is stopped is not preserved (NO in S501), the operation performed by the data processing unit 115 ends. The case means that the data processing is not performed in a case where the power saving operation state transitions to the normal state beforehand.

In a case where the information of the processing which is stopped is preserved (YES in S501), the data processing unit 115 determines whether or not the result of the processing is preserved, subsequently. In a case where the result of the processing is preserved (YES in S502), the data processing unit 115 reads the preserved result of the processing from the storage section, and resumes the data processing from a portion which is stopped in previous time (S503). In contrast, in a case where the result of the processing is not preserved (NO in S502), the data processing unit 115 specifies the data processing, which is stopped, based on information used to specify the preserved processing which is stopped, and executes again the specified data processing from the first (S504).

Figure 6:
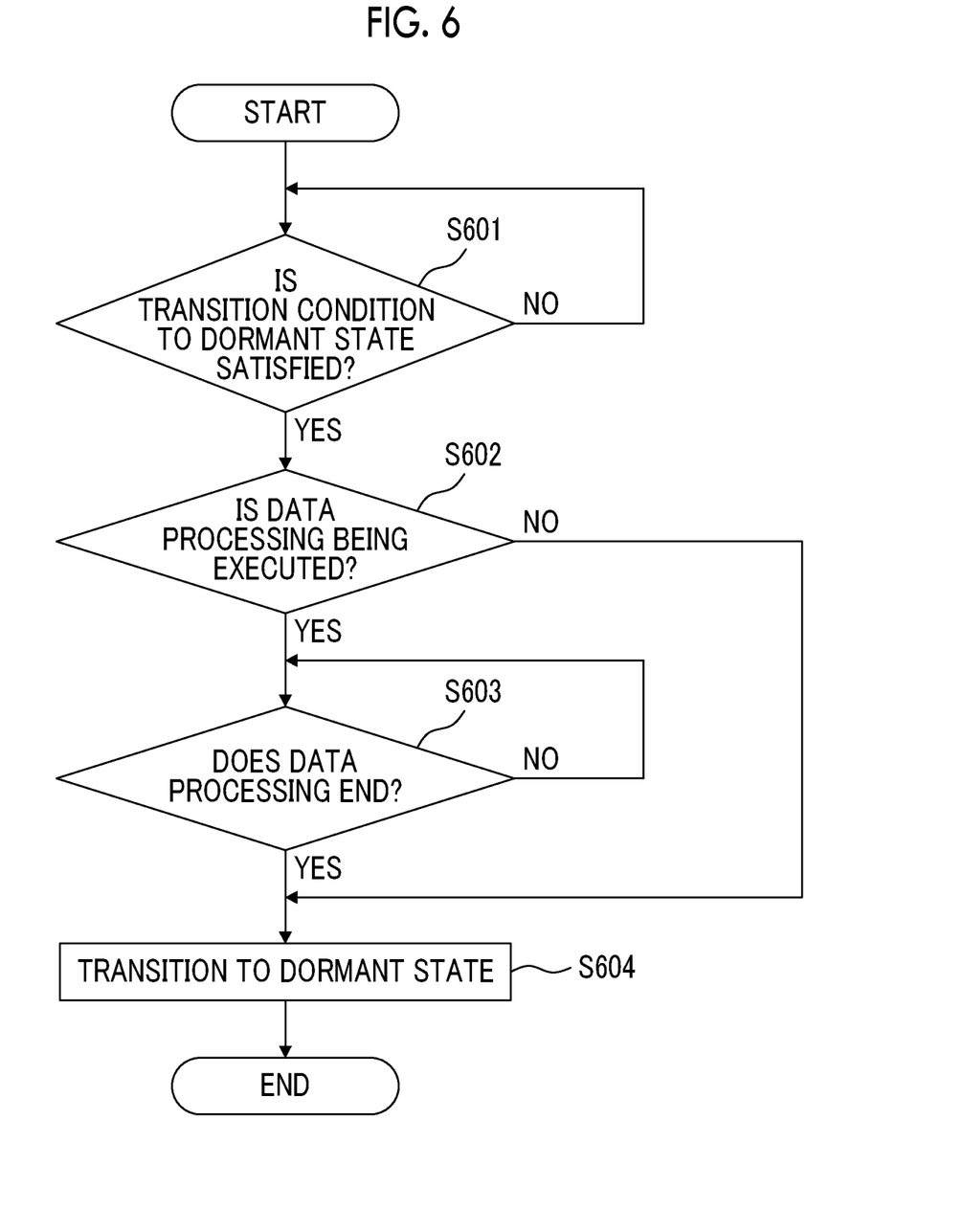
FIG. 6 is a flowchart illustrating the operation of the control device in a case where the transition is performed from the power saving operation state to a dormant state.

FIG. 6 is a flowchart illustrating the operation of the control device 110 in a case where transition is performed from the power saving operation state to the dormant state. In a case where the transition condition to the dormant state is satisfied in the image processing apparatus 100 in the power saving operation state, the control device 110 checks whether or not the data processing is being executed by the data processing unit 115 (S601 and S602). In a case where the data processing is not being executed (NO in S602), the system control unit 111 of the control device 110 causes the operation state to transition to the dormant state as it is (S604).

In contrast, in a case where the data processing is being executed by the data processing unit 115 (YES in S602), the system control unit 111 waits for transition of the operation state until the data processing by the data processing unit 115 ends, and causes the operation state to transition to the dormant state after the data processing ends (S603 and S604). That is, in this case, priority is given to completion of the data processing by the data processing unit 115 rather than the transition to the dormant state. Meanwhile, after the data processing by the data processing unit 115 ends, the system control unit 111 may cause the operation state to directly transition to the dormant state or may cause the operation state to transition to the dormant state after fixed time which is predetermined elapse. In a case where control is performed as the latter and a subsequent data processing starts immediately after one type of data processing ends, it is possible to suppress the transition between the dormant state and the power saving operation state from being repeated multiple times in a short time.

Furthermore, in operational examples described with reference to FIGS. 4 and 5, priority is given to the transition to the normal state rather than the data processing by the data processing unit 115, and the data processing, which is being executed, is stopped. In contrast, according to the type of the data processing to be executed, a case where priority is given to the completion of the data processing rather than the transition to the normal state may be taken into consideration. Here, in this case, the transition to the normal state is performed after waiting for the completion of the data processing.

Figure 7:
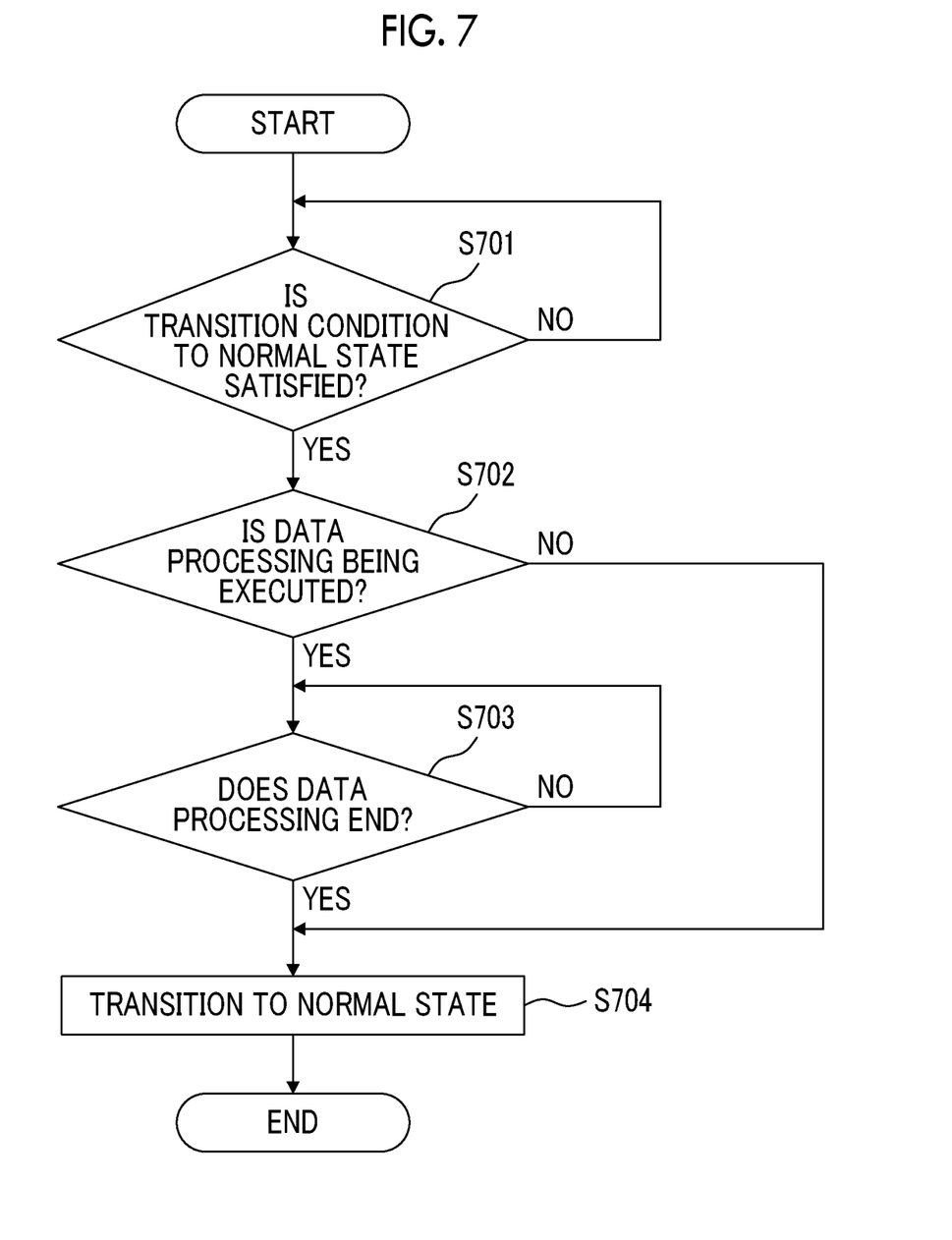
FIG. 7 is a flowchart illustrating another example in the operation of the control device in the case where the transition is performed from the power saving operation state to the normal state.

FIG. 7 is a flowchart illustrating another example in the operation of the control device 110 in the case where transition is performed from the power saving operation state to the normal state. In a case where the transition condition to the normal state is satisfied in the image processing apparatus 100 in the power saving operation state, the control device 110 checks whether or not the data processing is being executed by the data processing unit 115 (S701 and S702). In a case where the data processing is not being executed (NO in S702), the system control unit 111 of the control device 110 causes the operation state to transition to the normal state as it is (S704).

In contrast, in a case where the data processing is being executed by the data processing unit 115 (YES in S702), the system control unit 111 waits for the transition of the operation state until the data processing by the data processing unit 115 ends, and causes the operation state to transition to the normal state after the data processing ends (S703 and S704). That is, in this case, priority is given to the completion of the data processing by the data processing unit 115 rather than the transition to the normal state.

Hereinabove, although the exemplary embodiment of the present invention is described, the technical scope of the present invention is not limited to the exemplary embodiment. For example, in the operational examples, the transition to the normal state is performed after the data processing is stopped and normally ends in a case where the transition condition from the power saving operation state to the normal state is satisfied and the data processing is being executed. In contrast, the system control unit 111 may cause the operation state to directly transition to the normal state and the data processing unit 115 may perform an operation for stopping and normally ending the data processing in parallel with the transition. In addition, the present invention includes various modifications and substitutions of a configuration without deviating from the scope of the technical spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory; and
   a processor, coupled to the memory and configured to:
   execute image processing;
   control an operation of the information processing apparatus in any of two or more operation states including at least a first operation state, in which operations by all functions of the information processing apparatus are possible, and a second operation state in which operations by some functions of the information processing apparatus are limited;
   execute specific data processing, which does not involve the image processing, when during control is performed in the second operation state;
   wherein the processor stops the specific data processing in a case where the operation state is caused to transition from the second operation state to the first operation state due to the control by the processor.

2. The information processing apparatus according to claim 1,
   wherein the processor further configured to resume the specific data processing which is stopped in a case where the operation state is caused to transition from the first operation state to the second operation state due to the control.

3. The information processing apparatus according to claim 2,
   wherein the processor further configured to resume the specific data processing to be continued from a stopped portion according to a type of the specific data processing which is stopped.

4. The information processing apparatus according to claim 2,
   wherein the processor further configured to execute again the specific data processing which is stopped according to a type of the specific data processing which is stopped.

5. The information processing apparatus according to claim 1,
   wherein the memory is configured to store data,
   wherein the specific data processing by the processor includes processing with respect to the data stored in the memory, and
   wherein the processor further configured to control the operation of the information processing apparatus in a third operation state, in which an operation of the memory is limited, in addition to the first operation state and the second operation state, and does not cause the operation state to transition from the second operation state to the third operation state even though a transition condition to the third operation state is satisfied in a case where the processor executes the specific data processing with respect to the data, which is stored in the memory, in the second operation state.

6. The information processing apparatus according to claim 5,
   wherein the processor further configured to cause the operation state to transition to the third operation state after the specific data processing ends in a case where the transition condition to the third operation state is satisfied while the specific data processing is being executed by the data processing section.

7. The information processing apparatus according to claim 6,
   wherein the processor further configured to cause the operation state to transition to the third operation state immediately after the specific data processing.

8. The information processing apparatus according to claim 6,
   wherein the processor further configured to cause the operation state to transition to the third operation state after a fixed time elapses after the specific data processing by the data processing section ends.

9. The information processing apparatus according to claim 5,
   wherein the processor does not cause the operation state to transition from the second operation state to the first operation state even though the transition condition to the first operation state is satisfied while the specific data processing is being executed.

10. The information processing apparatus according to claim 1,
    wherein the processor does not cause the operation state to transition from the second operation state to the first operation state even though the transition condition to the first operation state is satisfied in a case where the specific data processing is executed in the second operation state.

11. A non-transitory computer readable medium storing a program which is executed by a computer that controls an information processing apparatus having a processor, the computer executing the program to be configured to:
    determine an operation state in any of two or more operation states including at least a first operation state, in which operations by all functions of the information processing apparatus are possible, and a second operation state in which operations by some functions of the information processing apparatus are limited;
    execute specific data processing, which does not involve the image processing by the processor, in a case where the computer determines that the operation state is the second operation state;
    wherein the computer stops the specific data processing in a case where the operation state is caused to transition from the second operation state to the first operation state due to the control by the processor.

12. An information processing apparatus comprising:
    image processing means for executing image processing;
    operation control means for controlling an operation of the information processing apparatus in any of two or more operation states including at least a first operation state, in which operations by all functions of the information processing apparatus are possible, and a second operation state in which operations by some functions of the information processing apparatus are limited;
    data processing means for executing specific data processing, which does not involve the image processing by the image processing means, when during the operation control means performs control in the second operation state;
    wherein the data processing means the specific data processing in a case where the operation state is caused to transition from the second operation state to the first operation state due to the control by operation control means.

* * * * *